United States Patent [19]
Ellsworth

[11] Patent Number: 5,699,983
[45] Date of Patent: Dec. 23, 1997

[54] ATOMIZING AND MIXING NOZZLE FOR HUMIDIFICATION PROCESS

[76] Inventor: Scott P. Ellsworth, 4365 S. Maidie La., West Valley City, Utah 84119

[21] Appl. No.: 630,060

[22] Filed: Apr. 12, 1996

Related U.S. Application Data

[62] Division of Ser. No. 110,556, Aug. 23, 1993, Pat. No. 5,524,848.

[51] Int. Cl.$^6$ .................................................. B01F 3/04
[52] U.S. Cl. ........................................................ 244/118.5
[58] Field of Search ................................ 244/118.5, 119, 244/129.1; 261/121.1; 55/255, 259, 257.5; 454/157

[56] References Cited

U.S. PATENT DOCUMENTS

| | | | |
|---|---|---|---|
| 2,112,041 | 3/1938 | Miller | 55/255 X |
| 2,138,153 | 11/1938 | Grisdale | 55/255 X |
| 2,360,229 | 10/1944 | Holmes | 55/259 X |
| 2,777,677 | 1/1957 | Bunch | 261/121.1 X |
| 3,276,698 | 10/1966 | Wood | 261/121.1 X |
| 3,740,805 | 6/1973 | Adams | 244/119 X |
| 3,756,580 | 9/1973 | Dunn | 261/123 |
| 3,864,440 | 2/1975 | Giocoechea | 261/122 |
| 4,098,853 | 7/1978 | Brown | 261/122 |
| 4,100,235 | 7/1978 | Thornwald | 261/142 |
| 4,261,416 | 4/1981 | Hamamoto | 244/118.5 X |
| 4,340,112 | 7/1982 | Sutoh | 165/16 |
| 4,742,760 | 5/1988 | Horstman et al. | 244/118.5 X |
| 4,819,548 | 4/1989 | Horstman | 244/118.5 X |
| 5,145,124 | 9/1992 | Brunskill et al. | 244/118.5 |
| 5,299,763 | 4/1994 | Bescoby et al. | 244/118.5 |

FOREIGN PATENT DOCUMENTS

| | | |
|---|---|---|
| 1232902 | 5/1986 | U.S.S.R. |
| 239761 | 9/1925 | United Kingdom |

OTHER PUBLICATIONS

"Aircraft Humidification System", ASME (1979) by P.F. Halfpenny.

*Primary Examiner*—Galen L. Barefoot

[57] ABSTRACT

An apparatus is disclosed to carry out a humidification process which includes the steps of blowing hot air upwardly through a plurality of tubes (34) submerged in a body of water (8) but which terminate above the water level (16), aspirating water into hot jets of air, atomizing the water (8) by the action of the air (17) on the water, evaporatively combining the mixture (17a) of water and air, mechanically separating the excess water droplets out of the air stream (17a) in a baffle (60), and discharging the humidified air (17b) into a duct (12) leading to a compartment (22) to be conditioned.

6 Claims, 7 Drawing Sheets

ATOMIZING AND MIXING NOZZLE FOR HUMIDIFICATION PROCESS

This application is a division of application Ser. No. 08/110,556 filed 23 Aug. 1993 entitled "Humidification Process and Apparatus" which now has become U.S. Pat. No. 5,524,848 on 11 Jun. 1996.

BACKGROUND OF THE INVENTION

1. Field of The Invention

Primary Concept

The present invention relates generally to methods and apparatus for humidifying a compartment, and, more particularly, to humidifying the crew and passenger compartments of a large commercial aircraft.

2. Discussion of Background and Prior Art a. Prior Aircraft Humidification Systems A primary problem faced by crew members of large commercial aircraft is that the air distributed to the crew compartments is very dry and causes respiratory and visual problems on long flights. Aircraft, such as, the Boeing 747, the AirBus 300, the McDonnell Douglas DC10 and the soon to be introduced new long range airliner the Boeing 777, can stay aloft for long periods of time. The dry air distributed to the cockpit causes dryness of the skin and mucous forming membranes of the body resulting in physical discomfort, including contact lens irritation and nasal and sinus respiratory problems. Similar problems are experienced by passengers in the passenger compartments of the aircraft.

Humidifiers for aircraft to solve the dry air problem are known, but are not commercially successful. The major airlines have either completely stopped using prior humidifier systems or endure the numerous problems that afflict these prior systems. These problems center around residual particles left behind after the water evaporates or mechanical and health hazards created by distributed water droplets. These problems are set forth generally below:

(1) Contaminant Build-up in the Humidifier. Prior humidifiers require frequent maintenance because water minerals build-up on the humidifier parts.

(2) Maintenance Required Before "C" Check. The aforesaid build-up forces maintenance every several hundred hours of operation, which is sooner than airlines' preferred maintenance at "C" check intervals only.

(3) Contaminant Build-up in the Ducts. Prior humidifiers spray water mist into the distribution system causing contaminant build-up on duct walls which can eventually restrict air flow or cause duct replacement.

(4) Dust in Personnel Compartment. Prior water mist spray humidifiers cause water soluble residual minerals left after the water evaporates from the mist droplet to blow through the personnel compartment as "dust".

(5) Growth of Pathogens. Water sumps support the growth of bacteria and fungus. In prior humidifiers with water sumps, these pathogens become entrained in distributed air, are inhaled by the flight crew and can cause crew member illness.

(6) Water in Air Distribution Duct. Unevaporated water in the form of water droplets entrained in distributed air of prior systems falls out and causes "rain" in the aircraft air distribution system and the served crew compartments, for example, as water dripping out of flight deck outlets causing serious flight hazards.

The present invention overcomes these problems through utilizing the principle of efficiently blowing air through a body of water in a chamber. The air cools as water evaporates into the air. Excess water droplets are separated out, the humid air is filtered and is then mixed with air supplied to the compartment. No such humidification system is known for use in aircraft prior to the present invention.

b. Other Prior Humidification Systems

Bubbling hot air through a body of water and inhaling the discharged humid air is known for use in treating respiratory ailments in the medical field. Such small portable systems may include a partial wall as a baffle plate in the path between the body of water and the outlet to prevent bubble turbulent water from directly entering the outlet port. U.S. Pat. Nos. 4,098,853; 3,864,440; 4,100,235. These systems do not filter the air and are unsuitable for use in humidifying aircraft compartments for the reasons stated above.

A gas washing system is known which passes dirty air centrally, downwardly into a body of water and then turns the air outwardly through a venturi while mixing spraying water with the air to strip entrained particles from the air which then bubbles to the surface of the body of water and passes through a drying apparatus to remove entrained water droplets before exiting the washer apparatus. U.S. Pat. No. 3,756,580. This method is not a humidification system, preferring dry outlet air instead, and it does not optimize the atomization and saturation of the air with water. Unlike the present invention, this system is unsuitable for use in an aircraft humidification system.

A known vehicle air temperature control system uses an ultrasonic vibrator as a humidifier to blow humid air through a duct directed at the driver's face. U.S. Pat. No. 4,340,112. Such a system fails to recognize the advantages of blowing a dry air source through the body of water to evaporate water droplets and mechanically removing the excess droplets and filtering the humid air before discharging it.

A prior greenhouse or agricultural use humidification system is known which bubbles air upwardly from below a body of water and has a number of sensors enabling automatic control of humidity, air temperature and water temperature. This system fails to recognize the increases in operating efficiencies and control achievable by baffling, and filtering the humid air to eliminate excess droplets and entrained minerals, and by properly atomizing the air in the bubbling process.

The latter two prior systems also suffer from many of the problems mentioned above which prevent their practical use in an aircraft humidifier system.

Of critical importance is the factor of the safety of the crew and passengers of the aircraft. Any aircraft system must be controllable from the cockpit while in flight, virtually fail safe and extremely reliable and durable. This high, exacting standard is necessary due to the narrow margin for error and the extreme danger to the lives of crew and passengers when handling emergencies while airborne. Extended required maintenance intervals allowing system inspection during routine programmed maintenance periods is also highly desirable for reducing failure risks and increasing operating efficiencies.

There is a long felt, present need for a humidification system for an aircraft that optimally saturates the air with water, retains dissolved minerals in uniform concentrations in the body of water, is periodically drainable at extended intervals, prevents distribution of excess water droplets, pathogens and residual minerals to the personnel compartments, uses no moving parts other than in the control elements, and is automatically controllable from the flight deck of the aircraft while meeting the exacting safety standard required of aircraft systems.

It is the object of the present invention to fill this long felt need.

SUMMARY OF THE INVENTION

A brief summary of the invention in order to fill the above need and to achieve the forgoing and other objects, benefits and advantages in accordance with the purposes of the present invention is broadly set forth below.

One aspect of the present invention employs the process steps of humidifying a compartment by blowing an air source into a body of water, evaporating water droplets from the body of water into the air mass, mechanically separating entrained water droplets from the humid air, filtering the humid air, and discharging the humid air into the compartment. The compartment is preferably the crew and passenger compartments of a commercial aircraft, but may also be a compartment in any other vehicle. The preferred air source is hot air from the aircraft trim air systems, but may be other air sources.

A further aspect of the invention is admitting the air through a plurality of tubes from beneath the body of water, the tubes terminating below the water level.

Another aspect of the invention includes passing the air source through a venturi which exits above the water level of the body while admitting water into the air source below the water level before entering the venturi, such as, for example, through an opening in the side wall of each inlet tube.

Other aspects of the invention include filtering the humid air in the line with the air being discharged from the body of water, and mixing the discharged air with other air going to the compartment. The other air may also include non-humid air from the air source bypassing the body of water. Some humid air exiting the body of water may also be recirculated to the air inlet source.

Another aspect of the invention includes filtering the dry inlet air before it passes through the body of water.

Still other aspects of the invention include draining water from the body of water to maintain a predetermined water level and periodically draining the body of water to remove dissolved solids.

One embodiment of the invention includes swirling the body of water by tangentially admitting the source air at the inlet, and allowing the humid air to exit centrally of the body.

Another embodiment of the invention separates excess water droplets from the humid air by passing the humid air through a slotted spinning baffle. This embodiment deflects entrained water droplets away from the spinning baffle by locating a floating bowl intermediate the body of water and the filter and prevents water from the body of water from entering the filter in various abnormal circumstances by floating the bowl against the spinning baffle to cover it.

The advantages of the apparatus and method described above are numerous and profound. They include the following:

1. Because evaporation occurs in the humidifier at the air-water interface, dissolved solids stay in solution, gradually increasing in concentration. This feature and the agitation, keep uniform mineral concentrations in the chamber. Routine drainage at regular intervals prevents excess contaminant build-up.
2. Since only an air and water vapor mixture leaves the humidifier, minerals, dust and pathogens do not enter the humidified compartment.
3. Pathogens are removed with the drained water and their build-up is minimized by virtue of the presence of higher temperatures in the preferred embodiment. These features minimize the risk of illness.
4. Only humid air without entrained moisture enters the duct that supplies air to the personnel compartment. Duct dew point control helps prevent water from condensing in the duct at low air temperatures. Thus, there is no water dripping from air outlets in the compartment.
5. In the preferred embodiment there are no moving parts other than control valves.
6. Routine maintenance intervals can exceed 5,000 hours.

DETAILED DESCRIPTION OF THE PREFERRED EMBODIMENT

1. Overview

A device 10 humidifies a stream of air 17 by directing that air through a reservoir 7 of water 8. Water 8 evaporates into the air 17a. After the air stream 17a (FIG. 1) has passed through the water, separators 60, 146 remove unevaporated water 8a (FIG. 2) from the humidified air stream 17b which is discharged to the compartment 22 to be humidified. This device 10 is intended to be used to humidify aircraft compartments 22 and in other humidifier applications where low weight, tolerance of hard water, and long intervals between servicing are important.

2. Definitions and Preliminary Matters

Figure 1:
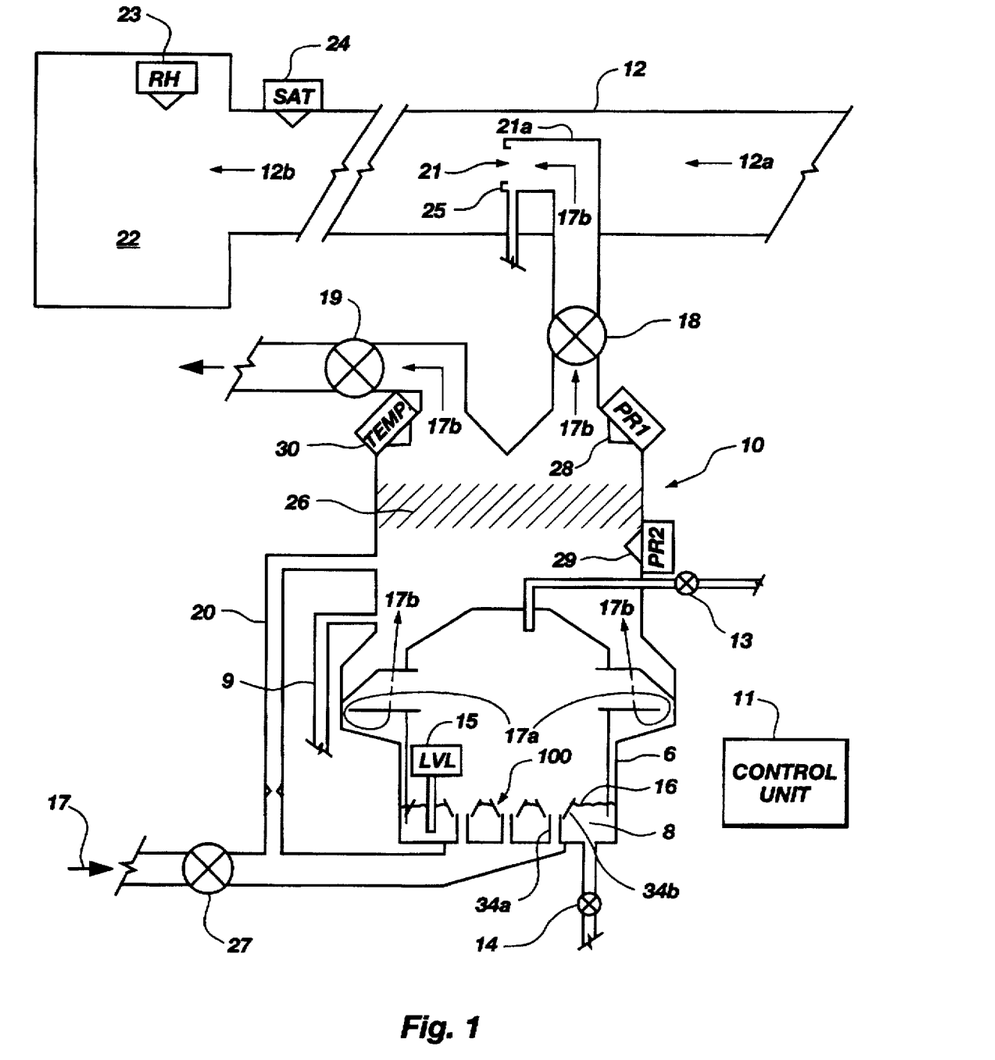
FIG. 1 is a schematic of a front, sectional elevation of a trim air humidifier system of the present invention.

A control unit is present in each embodiment, but, for simplicity and brevity, is shown only in FIG. 1. Control unit 11 performs all the control operations described below. While no wires are shown, it will be understood by those skilled in the art that the control unit 11 is connected to all of the valves and sensors FIG. 1 (and other Figs.) as well as to airplane power and master controls. Control unit 11 is of conventional construction and may be, for example, a microprocessor or similar programmable controller.

A control scheme to avoid condensing water in the conditioned air duct 12 is shown in FIG. 1. This scheme would most likely be employed wherever the humidifier output connected to a conditioned air duct and is assumed to apply to the other Figs. where appropriate even though not shown therein.

Figure 2:
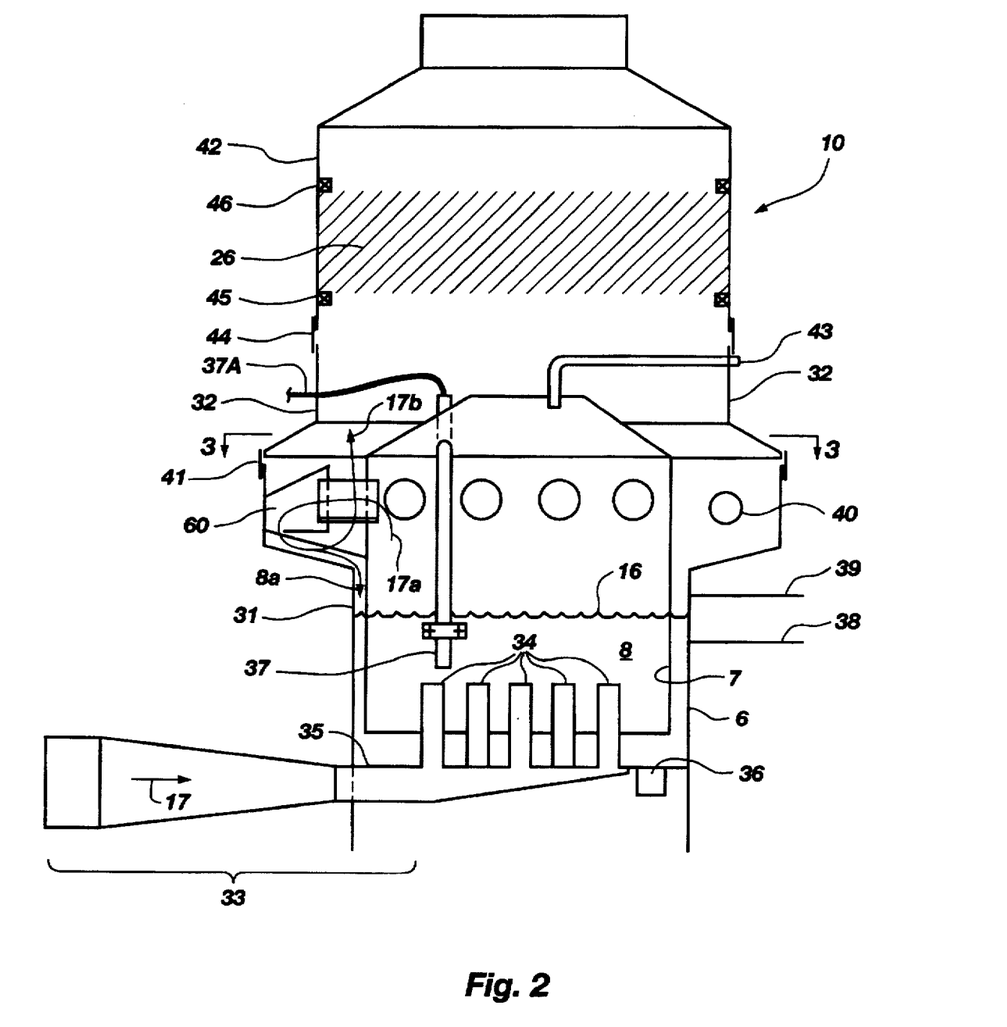
FIG. 2 is an enlarged and modified embodiment showing further details of the present invention taken along the line 2—2 of FIG. 3.
Figure 3:
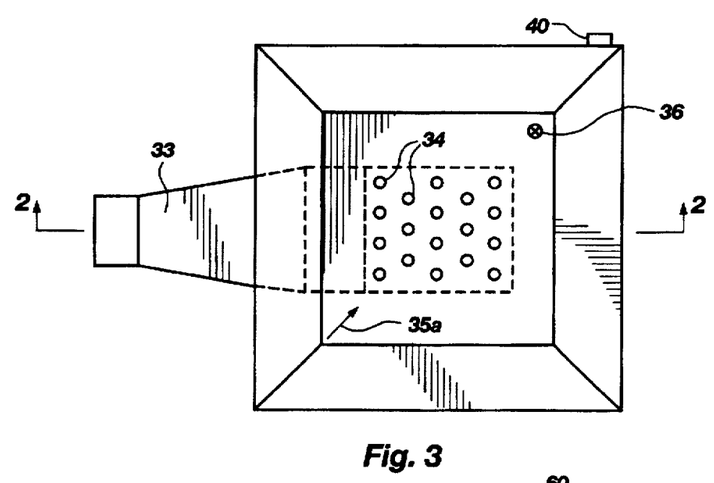
FIG. 3 is a top plan view of the bottom section of the embodiment of the present invention taken along the line 3—3 of FIG. 2.
Figures 4, 5:
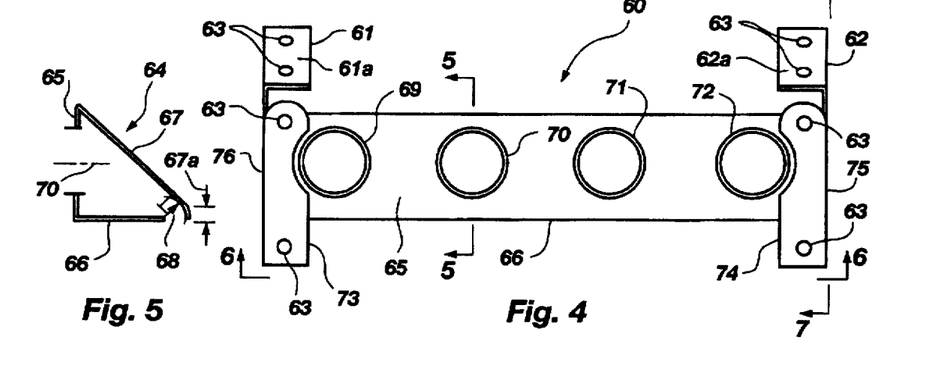
FIG. 4 is a front elevation of the baffle and brackets shown in FIG. 2 as seen from within the humidifier looking out toward the tubes through which the humidifier air leaves the chamber containing the body of water.
FIG. 5 is a section view taken along the line 5—5 of FIG. 4.
Figure 6:
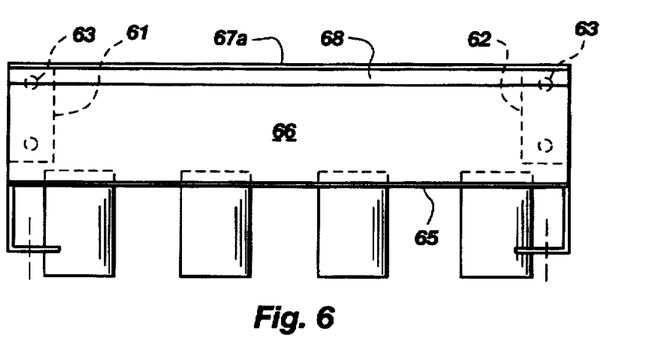
FIG. 6 is a bottom elevation of the baffle and bracket shown in FIG. 4 standing outside the chamber containing the body of water facing the chamber and then looking up at the bottom of the baffle.
Figure 7:
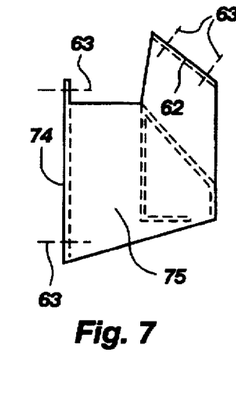
FIG. 7 is a side elevation of the bracket plates covering each end of the baffle taken along the line 7—7 of FIG. 4.
Figure 10:
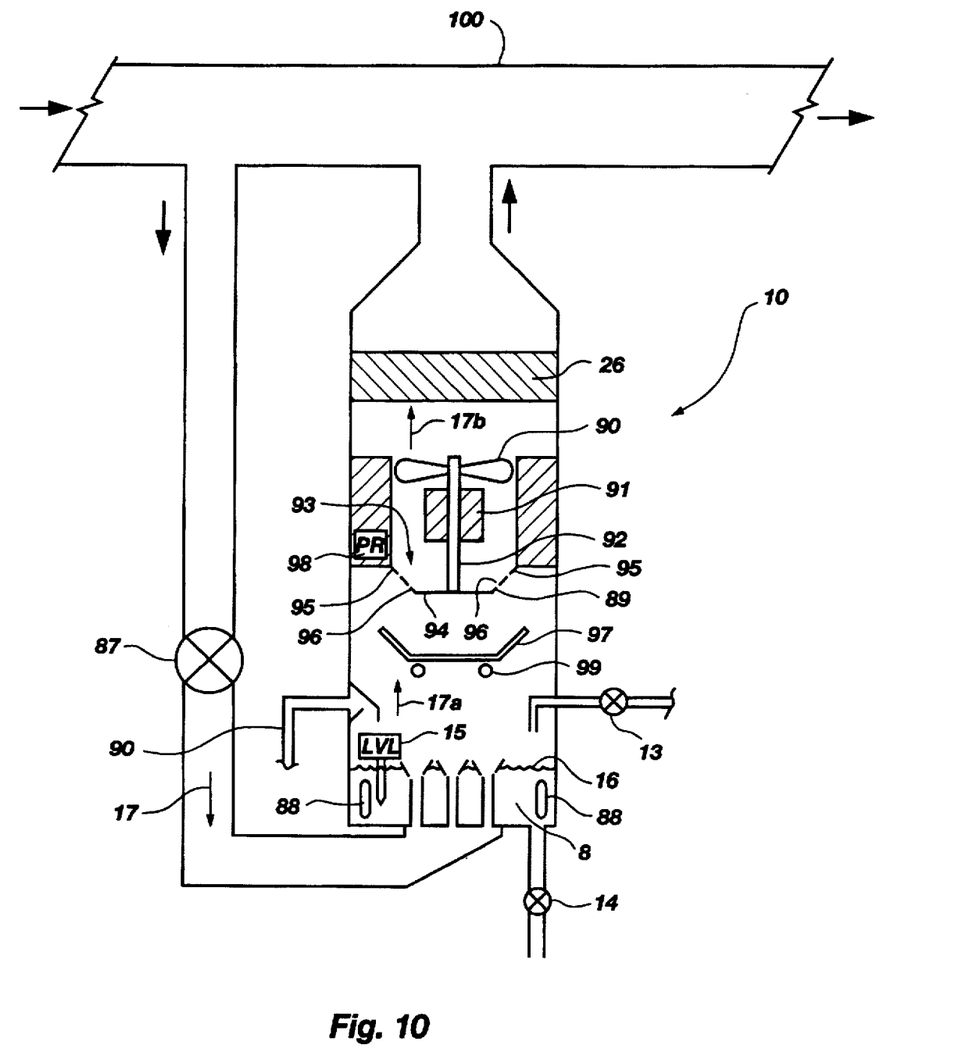
FIG. 10 is a schematic of a front, sectional elevation of a further embodiment of the present invention.

The fill valve 13, drain valve 14, and the water level/conductivity sensor ("LVL") 15 are only shown in FIGS. 1 and 10. It is understood these elements are present in all of the embodiments described herein. The fill valve 13 opens when the water level 16 reaches the low level point 38 (FIG. 2). It remains open until the water level 16 rises to the high level point 39 whereupon the fill valve 13 closes.

As an alternate to this on/off control, a continuous water level measurement system can be used in conjunction with a modulating fill valve 13a (not shown). Such a fill valve 13a would adjust itself so that the water level 16 remained constant, the water fill rate equalling the water evaporation rate. This process would have the advantage of yielding a more nearly constant evaporation efficiency from the humidifier 10 because such performance is sensitive to the water level. Such a modulating fill valve system controls the humidifier output by varying its water level.

The humidifier 10 is drained to remove dissolved solids left from the evaporation of water, to prevent freezing when the aircraft is stored and to discourage growth of pathogens. The drain valve 14 is normally closed when the humidifier 10 is operating. Drain valve 14 is open when the humidifier 10 is "off". During operation of the humidifier 10 when the dissolved solids in the water reach a predetermined concentration, the drain valve 14 is opened and the fill valve 13 is closed. This concentration level would be quantitatively below the dissolved solid saturation level, thereby minimizing the plating of solids on the humidifier. The dissolved solid concentration level at any instant may be approximated by measuring the conductivity of the water. After a timed interval to allow for complete draining, the drain valve 14 is closed and the humidifier 10 is filled with water as previously described.

Various alarm features may be added to the water level function. For example, a high level alarm point above the high water level 39 and a low level alarm point below the low water level 38 may be added as optional features. If the water level 16 reached the high level alarm point, either the aircraft is experiencing negative g's or the fill valve 13 has failed open. If the fill valve 13 has failed open, then the humidifier 10 would be commanded "off" and the drain valve 14 opened. If the water level 16 reached the low level alarm point, the drain valve 14 may be failed open or partially open or the fill valve 13 or water supply may be failed. In either case, the humidifier 10 would be shut "off". As the water surface in the inner chamber 7 is constantly perturbed by the falling water 8a and the air jets 34, some means of damping out these oscillations is needed in order to obtain a steady measure of the water level. Such a steady measure is necessary for reliable filling and alarm functions. Among other ways, averaging of this level may be accomplished by locating the level sensors 15 in a calmer area such as between the inner 7 and outer 6 walls, by using electronic averaging, or by putting the level sensors 15 in a tube 37 only open to the reservoir through a small opening. The disadvantage of this last option is that too small an opening may become plugged with mineral deposits such that the level sensor 15 may cease to detect the water level 16 in the humidifier 10.

3. FIGS. 1–7, 13–14 Trim Air Humidifier

FIG. 1 shows as the preferred embodiment the use of high pressure, hot air as a motive force for the air supply 17. This configuration is often the case in the environmental control system of large, commercial jet airliners where such an air source is often referred to as "trim air". This air is about 3–5 pounds per square inch, gauge and 250–350 deg. F. Hot air bleed from the aircraft engines may also be used. FIG. 1 also shows the option of controlling 18, 19 the humidity in more than one compartment 22. While the output of the humidifier is shown divided 18, 19 into two airflows, any number is possible. This example also shows the use of a bypass line 20 around the humidifier and a special output mixing device 21.

In FIGS. 1, 2, 13 and 14 similar numbers refer to similar elements.

As best seen in FIG. 2, humifier 10 is constructed as an outer housing 6 having three sections 31, 32, 42. The lower housing section 31 is served by an inlet 33 which is a manifold delivering the air inlet source air 17 to eighteen (18) vertical inlet tubes 34 the ends of which terminate below the water level 16 during normal operation. The bottom 35 of lower housing 32 of outer housing 6 has a bottom surface slanted 35a (FIG. 3) toward drain opening 36. Water level sensor 37 is located on the inner wall 7 with sensor wires 37a connect to control 11 and sense water levels including predetermined low 38 and high 39 water levels. Overflow port 40 leads to an exterior drain (not shown).

Middle housing section 32 is joined 41 at its lower end to lower housing section 31 and is joined 44 at its upper end to upper housing section 42. Fill tube connection 43 enters through housing sections 32. Filter 26 supported and retained in housing section 42 between filter retainer 45 and filter stop and gasket 46. In these Figs. the air 17 to be humidified enters the humidifier 10, 110 through a manifold 33 which distributes the air to the inner chamber 7, 136 of the humidifier 10, 110 through eighteen (18) round tubes 34 connected to the manifold 33. The exit 34a of these tubes is below the water level 16. The action of air 17 blowing through the water 8 sends large amounts of water droplets flying into the air. Because of the resulting increase in the air-to-water surface area, the evaporation occurs at a rate which can be predetermined by controlling the relevant variable parameters as would be well known to those skilled in the art given this disclosure. However, by this process, much more water is entrained into the air stream 17a than can be evaporated. Humid air 17a passes through baffles 60 (FIG. 2), or 140 (FIG. 13) which separate the excess water droplets 8a from the air stream 17a.

One embodiment of a baffle and bracket assembly 60 (FIG. 2) is shown in greater detail in FIGS. 3–6. While there are four such assemblies 60 in FIG. 2, one on each side of the rectangular (FIG. 3) inner chamber 7, only one is shown in FIG. 2 for simplicity and clarity. Baffle 60 is a triangular shaped (FIG. 5), hollow beam 64 having end plates 75 (FIG. 7) and 76 closing each end of the beam 64. End plates 75, 76 have in-turned upper 61a, 62a and lower 73, 74 flanges which attach to the inner chamber 7 wall by fasteners 63. Humid air leaving the body of water. 8 with entrained excess water droplets exits the inner chamber 7 via tubes mounted in holes 69, 70, 71, 72 in face 65 (FIG. 5) of beam 64 and hits slanted face 67 of beam 64 whereupon it and the water droplets are directed downwardly through drain slot 68 in the bottom face 66 of beam 64 adjacent the flat portion 67a of slant face 67. The air stream 17a continues to turn (270°) and exits 17b through the top (FIG. 2) of humidifier 10 passing in between tubes 69, 70, 71, 72 and leaving behind the water droplets 8a which are unable to make the 270° turn and drain back into the body of water 8. The humid air 17b passes through filter 26 and out the top of humidifier 10 to duct 12 through mixer 21.

Figure 13:
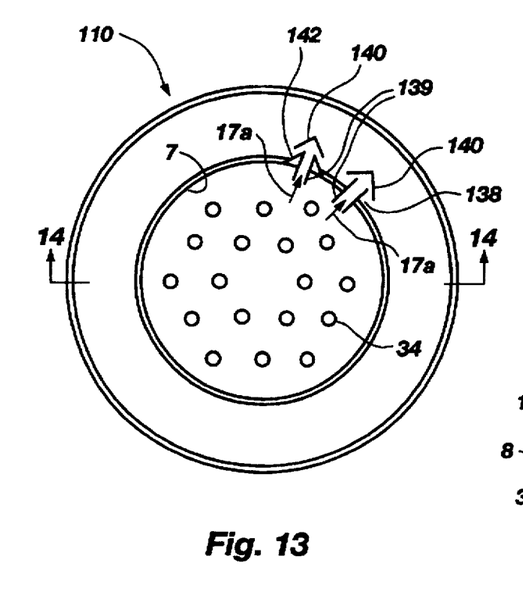
FIG. 13 is a top section of a further embodiment of the present invention taken along the line 13—13 of FIG. 14.
Figure 14:
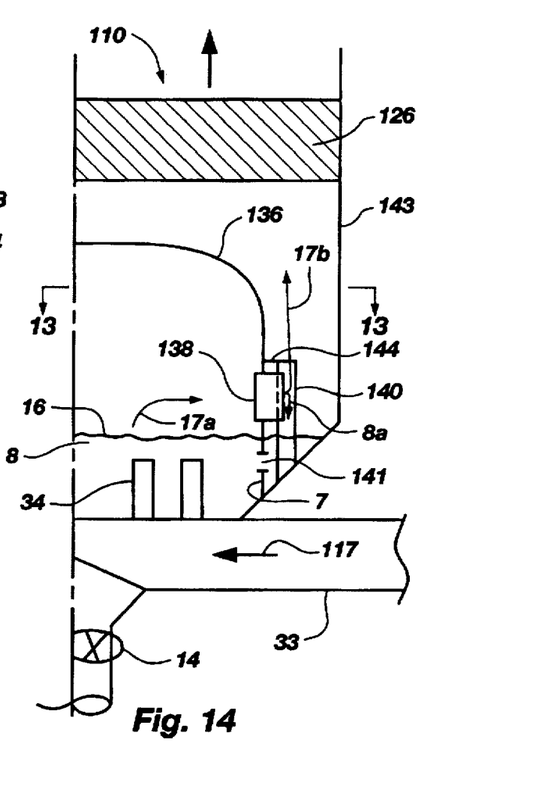
FIG. 14 is a front sectional elevation of one half a further embodiment of the present invention, the other half being substantially identical.

In FIGS. 13, 14 (only one half of FIG. 14 is shown for simplicity, the other half being essentially the same), water blown against the inner chamber dome 136 adheres to that surface and drains down through a gutter 144 to water body 8. The water 8 thus returns to the water sump through a downspout (not shown). The humid air 17a leaves the inner chamber 7 through eighteen (18) tall slots 138 in the inner wall. There is a lip 139 on the upstream edge of these slots that acts to prevent water flowing on the inner wall from becoming entrained into the air stream 17a. These slots 138 direct the air stream at baffles 140. This process separates most, if not all, of the remaining entrained unevaporated water droplets from the air stream 17a. The air stream 17a can make the turns created by this slot 138 and baffle 140 arrangement, but the water drops 8a cannot turn so sharply. They hit the baffle 140 and flow down the vertex of the baffle 140, returning to the sump 8 through holes 141 in the inner wall 7.

For simplicity, only two of the eighteen slots 138 and baffles 140 are shown in FIG. 13. The others are evenly spaced around the circumference of the inner wall 7. Two options for the slots 138 are shown in FIG. 13. One version of slot 138 shows a return 142 to the inner wall 7 on the chamber. The other version has no such return. This return 142 may be used to define the downspout of the gutter 144 described above. It may also be used to maintain the water separation efficiency of the slot and baffle arrangement.

After the air 17b leaves the baffles 140, it is directed upward by the outer wall 143. This humidified air stream 17b passes through filter 126 and is the output of the humidifier 110.

a. Operation of FIG. 1

In each humidified compartment 22, there is a relative humidity sensor ("RH") 23. When the sensed humidity in the compartment 22 is below the desired humidity, the zone control valve 18 opens to allow more humidified air 17b to flow into the conditioned air duct 12.

A water vapor saturation sensor ("SAT") 24 is placed in the coldest point in the conditioned air duct 12. Condensation occurring in the air duct 12 will result in water drops raining on occupants in the compartment 22. If SAT sensor 24 detects that moisture is condensing in the airstream 12b, then the compartment 22 demand for humidity is overridden. The zone control valve 18 is moved toward closed position just until no moisture is condensing. The SAT 24 sensor may be a relative humidity or dew point sensor.

Alteratively, SAT sensor 24 may be a temperature sensor being compared with compartment 22 dew point temperature calculated by the control unit 11. One skilled in the art will understand that with a few assumptions, it can be shown that the dew point of compartment 22 is essentially the same as the dew point in the air stream 12b. The dew point in compartment 22 is calculated from pressure, temperature and relative humidity in the compartment 22. The control unit would clamp compartment 22 humidity demand to that which will result in a dew point below the temperature sensed by SAT sensor 24.

Humidifier 10 output 17b is mixed with air in duct 12 in such a manner that any fog created by the coming together of the two airstreams does not impinge on the walls of the air duct 12. Fog occurs when warm, saturated humidifier output 17b is mixed with cold duct air 12a. When the saturation control is used as described in the previous paragraph, the fog only occurs in the mixing region between the two airstreams, and, once a homogeneous mixture is achieved, it disappears. In FIG. 1, the humidifier output airstream 17b is simply aligned with the centerline of the air duct 12. This structure is usually adequate when there is a long section of straight ducting 12 after the mixing point and the humidifier output mixer nozzle 21 diameter is small compared with the diameter of the air duct 12. Otherwise, more complicated mixing devices can be used. Note that the nozzle 21 has a scupper 25. In certain applications where long and/or uninsulated humidifier output ducting 21a is routed through cold areas, some of the moisture in the humidifier output 17b will condense on the duct walls 21a. The scupper 25 will prevent this water from entering the conditioned air duct 12 and causing a nuisance to compartment 22 occupants or a hazard to electrical equipment.

An alternative to the special mixing device 21 is also shown in FIG. 1. It is the bypass 20. Here, some of unhumidified source air 17 is bypassed around the humidifier 10. This process lowers the relative humidity of the humidifier output 17b and eliminates the fog problem discussed in the previous paragraph. Another advantage of this step is that it may evaporate the small water droplets that escape the water separation baffles 60, thus keeping the air filter dry 26. The disadvantage of this approach is that it requires more total air flow 17 and the temperature of the humidifier output 17b is higher.

The main air supply valve 27 controls the total air flow into the humidifier 10. Once it is commanded "on", it modulates so that pressure sensed by pressure sensor ("PR1") 28 is regulated to the desired value. As the zone control valves 18, 19 open up, the pressure at PR1 28 drops and the main air supply valve 27 opens up to provide the greater air flow required.

Depending on the efficiency of the baffles 60 in removing water droplets, the presence of a bypass line 20, and the saturation efficiency of the humidifier 10, the filter 26 may eventually become water logged. This condition may also occur when the aircraft experiences low or negative "g" forces, causing large amounts of water 8 to be thrown against the filter 26. One of the purposes of the filter 26 is to retain the water 8 in all of these cases so that it does not enter the air duct 12. The filter 26 is of the highly efficient type such as a HEPA filter (99.97% efficient at a 0.3 micron DOP). The filter 26 also filters any water mineral dust or organisms entrained in the humid air 17b. When the filter 26 becomes water logged, it will not pass sufficient amounts of air 17b or it may become damaged by the high pressure required to force enough air 17b through it to meet demand. The following illustrates one method of drying the filter 26. When the pressure sensed by pressure sensor PR2 29 reaches a certain amount higher than the pressure at pressure sensor PR1 28, the drain valve 14 is opened until the water level 16 drops below the tops of the air inlet tubes 34. Now, unhumidified, hot trim air will be reaching the air filter to dry it out. Once PR2 29 senses the appropriate pressure, the water level 16 is returned to normal level and the humidifier 10 begins humidifying again. Some regulation of the air flow 17 rate used to dry may be needed so that temperature control of the compartments 22 is not adversely affected. At this reduced flow rate, the sensor PR2 29 may not be able to be used to determine when the filter 26 is dry. As an alternate method, the temperature sensor ("TEMP") 30 may be used to monitor the drying. As the filter 26 drys out, the temperature will rise. When the temperature reaches a certain value, the drying process is stopped and the humidifier 10 is returned to normal mode. If, after a certain period of time, the PR2 29 pressure does not return to normal (and/or the temperature decrease), then the control unit 11 will assume that the filter has become plugged with solid particulate or that the water problem is permanent (such as from failed "open" fill valve 13) and will shut down the humidifier 10.

Besides its previously discussed uses in drying the filter 26, the temperature sensor 30 can be used to shut down the humidifier 10 if for some reason (failed "open" drain valve 14, failed "closed" fill valve 13, airplane maneuvering, etc.) it fails to humidify and hot air is pouring into the air duct 12.

Figure 8:
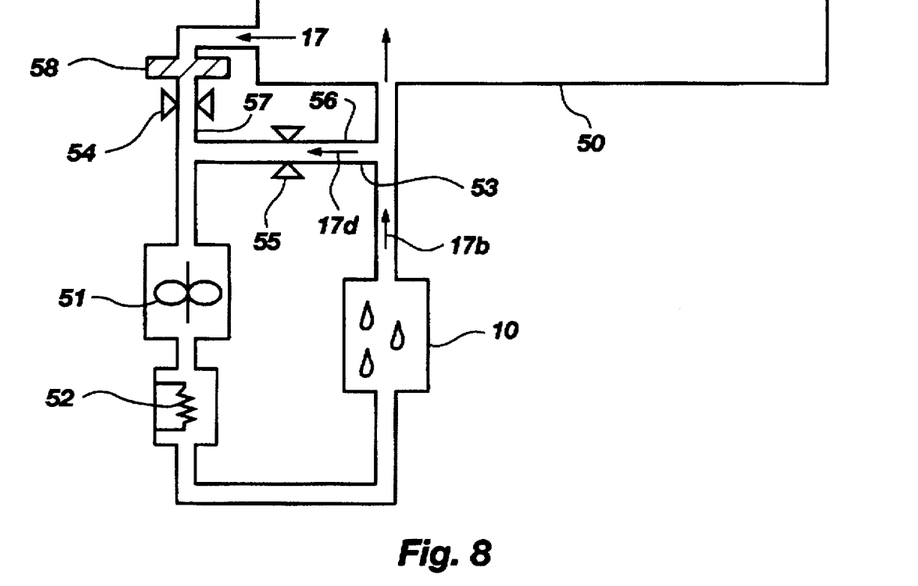
FIG. 8 is a schematic of a further embodiment of the present invention.

4. FIG. 8—Humidifier With Fan, Inlet Filter, Heater, and Recirculation

FIG. 8 shows the humidifier 10 attached to a compartment 50 rather than an air duct as in the other figures. It uses an inlet air filter 58, a fan 51, an air heater 52, and it has a recirculation line 53. The humidifier 10 is as shown in FIGS. 1–7.

a. Fan Operation

A fan 51 is used here to move air through the humidifier 10. It is the only continually moving part in the humidifier system. Fan 51 is not exposed to water mineral dust or water droplets, only humidified air. Thus, there will be no degradation of fan 51 life due to build-up of water mineral on the fan impeller causing pre-mature bearing failure.

b. Recirculation Line

Some portion 17d of the humidified air 17b leaving the humidifier 10 passes through the recirculation line 53 and mixes with incoming unhumidified air 17. The rest of the humidified air 17b enters the humidified space 50. The ratio of recirculation 17d to incoming 17 is controlled by the restrictors 54, 55 in the air ducts 56, 57. This recirculation line 53 causes a portion 17d of the air 17b to recirculate through the humidifier 10. The advantages of such arrangement are as follows. First, the absolute humidity ratio (mass of water per mass of dry air, e.g. lb. $H_2O_{lb.\ air}$) of the humidified air entering the "humidified space" is higher, requiring less air and smaller ducts to deliver the same amount of moisture. This condition is especially true when considering the typical heater output air temperature limitations imposed by safety and material concerns. Second, and closely related to the first, is that a given absolute humidity of the output to the humidified space 50 can be obtained with the humidifier 10 operating at lower temperatures. The advantage here is that the solubility of certain solids dissolved in water 8 increases as water temperature decreases. Higher solubilities result in less weight penalty from water 8 which is drained and dumped (water 8 that is drained from humidifier 10 to remove dissolved solids is extra water that must be carried on the airplane beyond that which is evaporated. Because it does not humidify the air, this extra water is considered a weight "penalty" because it decreases the airplane's pay load) and less plating of minerals on the humidifier 10. Third, but not shown here, the atomizing of the water 8 can be maintained even with variable flow rates of incoming air. Changes in incoming air flow rate would occur when a valve was used to regulate the humidity output rather than the heater that is shown here. The atomizing of the water 8 in the humidifier 10 is strongly dependent on air velocity through the tubes 34 where the air 17 first contacts the water 8. With air 17d always passing through the recirculation line 53, atomization could be maintained even without any incoming air 17. Without the recirculation line 53, atomization and hence, humidification, would cease at low flow rates. The main disadvantages of the recirculation line 53 are that the fan 51 and heater 52 are exposed to much higher humidities (i.e. greater propensity for corrosion) and the fan 51 has to be larger because it is passing more than just the incoming air.

c. Heater

Energy is absorbed by the water 8 as it evaporates. An advantage of this invention is that this heat of vaporization can be mostly supplied by a heat source that is not in direct contact with the water. Thus, the maintenance problems associated with water mineral scale on the heating elements is eliminated. Heating the air 17 increases the amount of moisture it can hold before becoming saturated. As the air 17b leaving the humidifier 10 is nearly saturated in most situations, the absolute humidity of the humidifier output can be controlled by varying the temperature of the air leaving the heater 52. The most reasonable source of heat for this application would be electricity. There are various devices available that can vary the power used (i.e. the amount of heat supplied to the air) by the electric heater 52 based on a control signal. Thus, the electric heater 52 can be used to control the humidity in compartment 50.

d. Inlet Air Filter

An air filter 58 is used to filter the air inlet source 17. Besides water mineral deposits, organisms such as fungi can foul a humidifier. This fouling may require more frequent servicing than is desired in order to maintain acceptable humidification performance.

These organisms require organic material to sustain life. Most of this organic material is brought in with the air stream 17. Air sources such as personnel compartments have especially high organic content.

Eliminating this organic material will reduce the fouling of the humidifier 10 to an acceptable level. Inlet air filter 58 is highly efficient at removing even sub-micron size particles and as such will sufficiently remove organic material from air inlet source 17. Additionally, it will minimize particulate fouling of orifice 54, fan 51, and heater 52.

Figure 9:
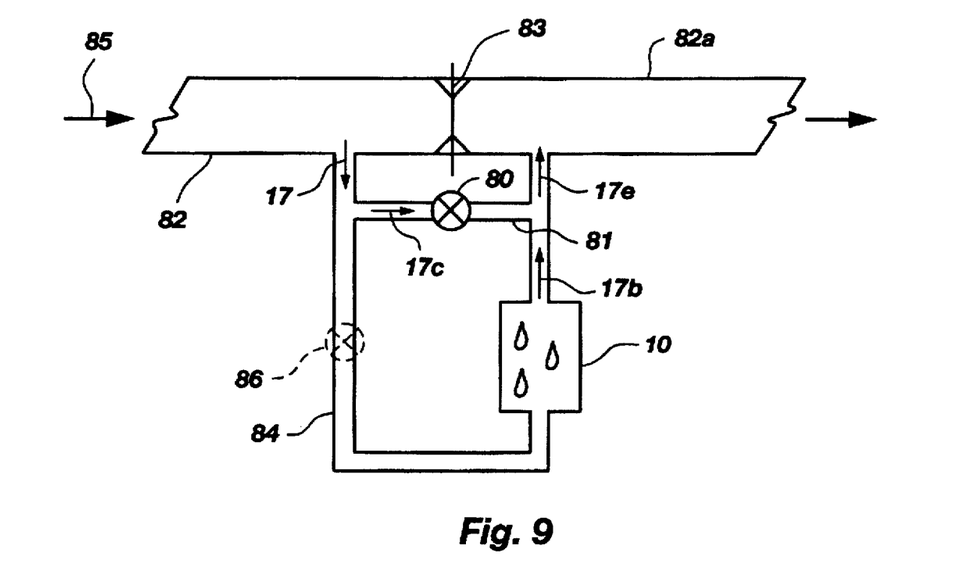
FIG. 9 is a schematic of a further embodiment of the present invention.

5. FIG. 9—Humidifier With Bypass

This embodiment shows the humidifier 10 with a bypass 80, 81 to control the humidifier output 17b. Air 17 is forced through the humidifier system by the motive force of the air in the air duct 82 and the pressure drop across the restrictor 83.

The obvious advantages of this example are that it may be the least expensive to build, most compact, and lightest of the various embodiments disclosed herein. Another advantage is that it requires no additional energy input other than what is needed to operate the controls. The heat of vaporization comes from the air itself and would be added to the air by the compartment heating system. Also, there are no moving parts except for the valves 80, 86 and those in humifier 10. Having less parts and no rotating part leads to longer intervals between failures.

The bypass 80, 81 operates in the following way. When less humidity is desired, the bypass valve 80 is moved more open. Air 17c that would have gone through the humidifier 10 now goes through the bypass line 81 instead. As this air 17c is not humidified but mixes with the now reduced amount of air 17b from the "humidifier", the humidity of the air 17e returning to air duct 82 from the humidifier system is lowered. When more humidity is required, the reverse happens, i.e. the bypass valve 80 is moved more closed, etc.

A valve 86 in the duct to the humidifier 10 could also be used to control the humidifier output instead of or in addition to the bypass 80, 81 control. In applications where no additional heating occurs in the humidifier system, a significant portion of the air 85 in the air duct 82 must be diverted through the humidifier 10 in order to achieve the humidity levels desired in the humidified compartment. When only a valve 86 is used on the humidifier air stream 17 and no bypass 80, 81 is present and this valve 86 is closed or mostly closed, a significant reduction in air flow in the air duct 82a downstream of restrictor 83 would occur. There are cases where a relatively constant air flow in the downstream air duct 82a is desired. The bypass line 81 is a step in that direction. Air 17c is bypassed around the humidifier 10 rather than restricted from flowing. Actually, for a given pressure head in duct 82 and with the bypass valve 80 fully open, there would be more air flow 85 in the downstream air duct 82a than at other valve positions. And some air 17b would still be passing through the humidifier 10. Thus, this arrangement of a bypass valve 80 would only give partial control over the humidifier output 17b. This flow level might be sufficient in many cases as the humidifier 10 can be drained if no humidification is desired at all. However, if a valve 86 is placed in the duct 84 to the humidifier 10 in addition to the bypass valve 80, then constant flow may be maintained in the downstream air duct 82a for any level of humidity output 17b and humidity output may be varied continuously from 0 to 100% of capacity.

Of course, all air valves 86, 80 may be eliminated. With a relatively constant air flow in the air duct 82 and with a small range of air temperatures, a properly sized humidifier 10 might provide acceptable humidity levels in the humidified compartment without any control of the humidifier output. Humans find acceptable very wide variations in relative humidity levels. Condensation control in the duct 82 may still be achieved by draining the humidifier 10 when the temperature in the air duct 83 is too low.

6. FIG. 10—Humidifier With Spinning Baffle

The main feature of this embodiment is that water separation from the airstream 17a after humidification is accomplished by a slotted spinning baffle 89. Other main features shown here are the in-line humidity control valve 87 and a positive temperature coefficient ("PTC") thermistor type heater 88 in the water reservoir.

a. General

Where a fan is required, this embodiment would make a most compact package. The fan 90, 91 is above the water level 16 to preclude accidental wetting of the electrical parts. Being downstream of the humidifier 10 but before the filter 26 does expose the fan impeller 90 to small amounts of water droplets as well as potentially increased corrosion from humid air 17a. The air is heated by the fan and these water droplets should evaporate. It is not certain whether this would cause the fan impeller 90 to become unbalanced by a buildup of residual water minerals. An advantage of the fan heating is that the filter 26 should always be dry.

b. Spinning Baffle

Water separation by spinning a baffle is known in the prior art. The spinning baffle 89 is a truncated conic section. The baffle 89 rotates around the axis 92 of the cone. It is open 93 on the larger end and completely closed 94 on the smaller end. The sloping sides 95 have parallel slots 96 evenly spaced around the whole circumference. The slots 96 start near one end 94 and continue to the other end 93. There are no openings on the bottom (the smaller end). The slots are slanted so that they are not parallel to the axis 92 of the cone 89. Relative to direction of rotation, the end of the slot 96 toward the bottom 94 is the leading end.

Water that hits the spinning baffle 89 initially adheres to it, but then is slung off by centrifugal force while the air enters the rotating slots 96 and then is discharged as humid air 17b minus the excess water droplets.

c. Floating Bowl

The floating bowl 97 serves two purposes. First, it deflects most of the water 8 away from the spinning baffle 89 and thereby improves its separation performance. Second, when water 8 from the reservoir moves toward the spinning baffle 89 en mass, either in the case of low or negative g forces or in the case of fill valve 13 failures, the floating bowl 97 floats up and covers the spinning baffle 89 and seals it off from the water 8. This protects the filter 26, the motor 91 and the fan impeller 90 from being damaged by the water 8. At the same time, a pressure sensor 98 senses that the floating bowl 97 had covered the spinning baffle 89. In the case of negative g forces, the control unit 11 may have the motor 91 energized to keep the floating bowl 97 tightly sealed, but open the drain valve 14 and shut off the PTC thermistor 88. Once normal g forces occur again, the motor 91 may be shut off to let the floating bowl 97 drop back to its rest 99. After a time period, the humidifier may be restarted.

d. Heater

A heater 88 is shown in FIG. 10 to increase the water vapor output of the humidifier 10. It is immersed in the water reservoir 8. The temperature of the heater 88 is not high enough to cause boiling. The fact that heater 88 is only heating the water 8 and not boiling it significantly reduces, but does not eliminate, scale buildup on the heater 88.

A PTC thermistor as a water heater has the advantage of not needing controls to maintain the water at a desired temperature. The thermistor 88 is constructed to be self-limiting at the design temperature setting. Because of electromagnetic interference and short life, simple thermostat-relay type heater controls are not appropriate for aircraft applications. More complicated electronic controls are required when typical heating elements are used, and using a thermistor would avoid use of such controls.

One manufacturer mentions that the expansion and contraction that occurs as the heater is powered (heated up) and then unpowered (cooled down) is enough to break off any scale buildup. A PTC thermistor's power usage in a humidifier situation like this is more constant. The thermistor may not be able to use this thermal expansion concept to eliminate scale buildup. If scale buildup is a problem, then a common heater element, controls to cycle it and a water temperature sensor would need to be added instead of the thermistor.

e. Humidity Control

The humidity control valve 87 controls the amount of air 17 that flows through the humidifier 10. When less humidity is required, the valve 87 moves toward the closed position. Air 17 is restricted from entering the humidifier and, consequently, less water vapor is carried in the air duct 100. When more humidity is required, the reverse happens, i.e., the valve 87 moves towards open, etc. Rather than use the humidity control valve 87, a normal heating element may be regulated according to the demand for humidity eliminating the need for valve 87.

Figure 11:
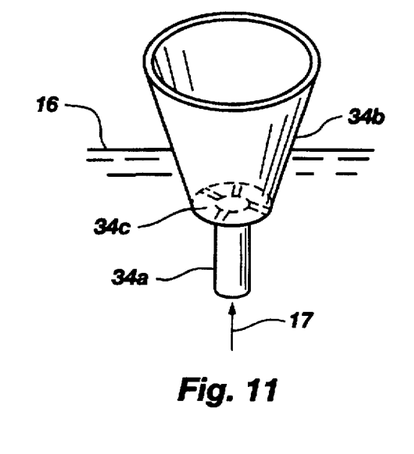
FIG. 11 is a perspective of a venturi cup which is a feature of the present invention.
Figure 12:
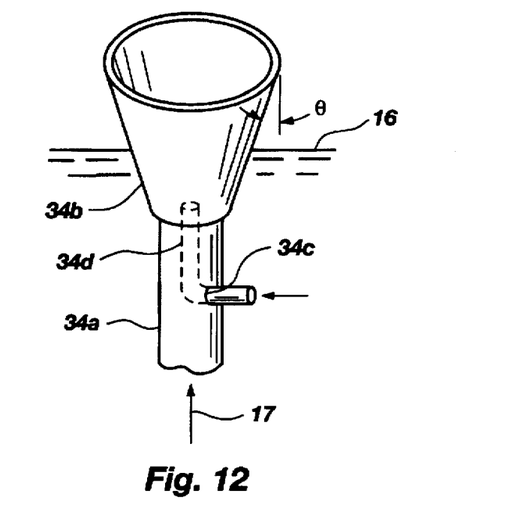
FIG. 12 is a further embodiment of the venturi of FIG. 11.

7. FIGS. 11-12 Venturi Atomization

Shown in FIGS. 11-12 are still further embodiments in which the air inlet tubes 34a which are located below the normal water level 16 i.e. to operate on the same concept illustrated in FIG. 1 terminate in a venturi shaped portion 34b above the water level 16. In the embodiment of FIG. 11 water enters the inlet air stream 17 through openings 34c at the narrow end of the venturi 34b below the normal water level 16. Alternatively, as shown in the embodiment of FIG. 12, the holes 34c are in the side wall of the tube 34a into which is placed an elbow fitting 34d, water entering the elbow 34d through water pressure and the suction of the venturi. The angle θ defining the divergence of the venturi walls is selected to be great enough to prevent the water droplets, now evaporatively combined with and entrained in the air jetting from the venturi, from adhering to the walls of the venturi, thereby preventing mineral build-up and enhancing saturation efficiency.

The advantages of this continuous stream or jet concept over bubbling are as follows: First, the water is broken up into smaller water droplets according to carburetor-atomizer principles. Better atomization aids in attaining higher saturation efficiencies. Second, the noise caused by the air bubbling through the water is replaced by the higher frequency noise of the atomizer (it is advantageous to shift frequency of noise sources higher because higher frequencies self-attenuate faster). Third, bubbling the air through the water causes some forces (time-varying-oscillating) on the humidifier that may be unacceptable (heavier weight metals being required to preclude premature fatigue or failure). Fourth, having the tubes 34b out of the water and having a venturi recovery of static pressure would greatly reduce the air pressure drop through the device. This feature makes the humidifier concept more feasible for humidification in an airplane where the motive force for the air is due to a restriction in the main air duct between the humidifier inlet and outlet such as described in Section 5 and shown in FIG. 9.

Figure 15:
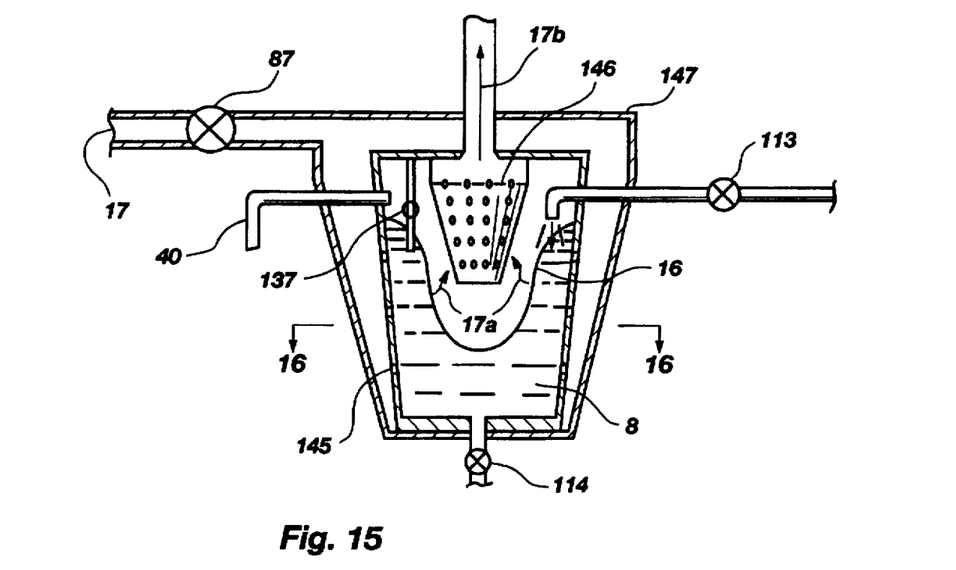
FIG. 15 is a front sectional elevation of a further embodiment of the present invention.
Figure 16:
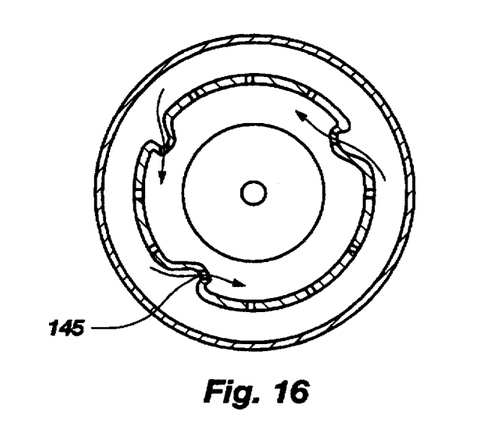
FIG. 16 is a top sectional view taken along the line 16—16 of FIG. 15.
Figure 17:
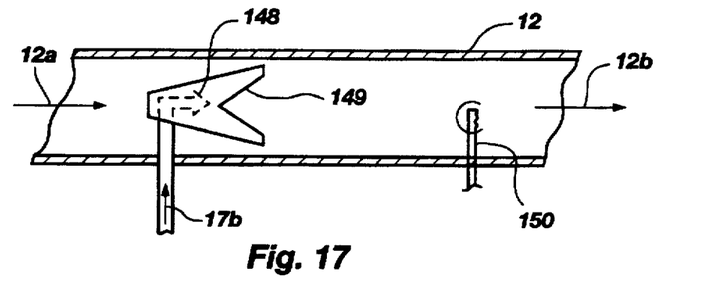
FIG. 17 is a schematic of an injector mixer which is a further feature of the present invention.

8. FIGS. 15-17

A further embodiment of the present invention is shown in FIGS. 15-16 where similar numbers used with prior embodiments discussed above refer to similar features and function similarly as described above. Trim air 17 enters through humidification regulation valve 87 and manifold 147 which admits the air 17 tangentially through inlet nozzles 145 (FIG. 16) causing water 8 to swirl and maintain a normal swirling water level 16. Bi-level (high and low) water sensor 137 signals high and low water levels to control unit 11. Water fill 13 and overflow 40 functions are as previously described. Water 8 is evaporated in the air stream 17a. Excess water droplets are separated centrally in water separator 146 and humidified air 17b exits centrally to be filtered and discharged to the flight deck.

FIG. 17 shows humid air 17b being injected 148 by a nozzle into a bifurcated mixer 149 so as to eliminate fog in flight deck air duct 12. The humidity downstream 12b being sensed by dew point sensor 150 under the control of control unit 11.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The various embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of humidifying a compartment comprising the steps of:

providing an air inlet source comprising a continuous jet of air, entraining from a surface of a body of water water droplets into the air, evaporating water from the surface of entrained water droplets into the air to form humidified air, separating excess droplets from the humidified air and distributing the humidified air into the compartment wherein the entraining step further comprises the steps of:

extending the surface of the body of water into the interior of the jet and entraining water droplets into the air from the extended surface.

2. The method as set forth in claim 1 wherein the extending step further comprises the step of:

aspirating water into the jet by a venturi effect of the jet.

3. A process of humidifying an air source by evaporating water droplets into the air mass and discharging humidified air into a passage comprising the steps of:

providing a reservoir of water having an upper surface;

providing a continuous stream of air having an interior;

entraining by the stream from another surface of the reservoir droplets of water;

atomizing of the droplets by the stream to reduce the mean diameter and increase the number of droplets;

evaporating water as vapor into the air from the surfaces of the droplets to form humid air; and mechanically separating entrained water droplets from the humid air, wherein:

the providing step further comprises the step of passing the stream of air through a tube which ends above the upper surface of the reservoir of water and the entraining step further comprises the step of conveying water directly from the reservoir of water into the interior of the stream of air through such means so that the other surface of the reservoir from which droplets of water are entrained lies wholly within the interior of the stream of air.

4. In a process of humidifying a compartment including vaporizing water from a body of water into an air stream and discharging the humidified air to the compartment comprising the steps of:

blowing a dry air source, comprising a continuous jet, past a body of water;

removing by the jet, from an interface between the water and the jet, droplets of water into the jet by entrainment;

atomizing of the droplets into smaller droplets by the jet;

evaporating water as water vapor into the air from the surfaces of the smaller droplets; and discharging the humidified air into the compartment wherein:

the blowing step further comprises the step of passing the jet of air through a venturi which exits above the body of water and the removing step further comprises the step of admitting water into the venturi from the body of water.

5. In a process as set forth in claim 4 wherein the admitting step further comprises the step of:

conveying water to the venturi from the body of water through a passageway.

6. In a process as set forth in claim 4 wherein the admitting step further comprises the step of:

admitting water to the venturi from the body of water through at least one hole in the venturi which hole is located within the body of water.

* * * * *